US005630956A

United States Patent [19]

Lynch

[11] Patent Number: 5,630,956
[45] Date of Patent: May 20, 1997

[54] OIL FILTERING AND REFINING DEVICE

[75] Inventor: Donald C. Lynch, Minnetonka, Minn.

[73] Assignee: Certified Technologies Corporation, Minneapolis, Minn.

[21] Appl. No.: 492,533

[22] Filed: Jun. 20, 1995

[51] Int. Cl.[6] .................................. B01D 3/28; B01D 27/08
[52] U.S. Cl. .......................... 210/180; 210/184; 210/436;
210/416.5; 196/46.1; 196/115; 196/121;
159/28.4; 159/28.6
[58] Field of Search ........................ 210/168, 180,
210/184, 416.5, 436, 472; 123/196 A, 196 AB;
196/46.1, 115, 121, 28.3, 28.4, 28.6

[56] References Cited

U.S. PATENT DOCUMENTS

| | | | |
|---|---|---|---|
| 1,237,738 | 8/1917 | Allen . | |
| 1,608,571 | 11/1926 | Watson . | |
| 2,161,964 | 6/1939 | La Brecque | 196/16 |
| 2,174,265 | 9/1939 | Holt | 196/16 |
| 2,274,113 | 2/1942 | White | 210/131 |
| 2,392,548 | 1/1946 | Pogue | 196/16 |
| 2,425,377 | 8/1947 | La Brecque | 196/16 |
| 2,428,939 | 10/1947 | Morris | 210/122.5 |
| 2,446,126 | 7/1948 | Crake | 210/150.5 |
| 2,472,717 | 6/1949 | Morey | 196/16 |
| 2,623,612 | 12/1952 | Scheiterlein | 184/104 |
| 2,785,109 | 3/1957 | Schwalge | 196/15 |
| 2,839,196 | 6/1958 | Schwalge | 210/180 |
| 2,858,026 | 10/1958 | Lorimer | 210/444 |
| 3,473,629 | 10/1969 | Robinson et al. | 184/6 |
| 3,550,781 | 12/1970 | Barrow | 210/180 |
| 3,616,885 | 11/1971 | Priest | 196/128 |
| 3,656,627 | 4/1972 | Briggs | 210/315 |
| 3,756,412 | 9/1973 | Barrow | 210/180 |
| 3,859,975 | 1/1975 | Hines | 123/196 |
| 3,912,631 | 10/1975 | Turman | 210/136 |
| 3,915,860 | 10/1975 | Priest | 210/136 |
| 3,956,071 | 5/1976 | O'Brien | 196/46 |
| 3,959,975 | 6/1976 | Hines | 123/196 |
| 4,006,084 | 2/1977 | Priest | 210/180 |
| 4,066,559 | 1/1978 | Rohde | 252/10 |
| 4,093,548 | 6/1978 | Sterkenburg et al. | 210/180 |
| 4,115,201 | 9/1978 | Malec | 196/46.1 |
| 4,146,475 | 3/1979 | Forsland | 210/71 |
| 4,189,351 | 2/1980 | Engel . | |
| 4,224,042 | 9/1980 | Garigioli | 55/237 |
| 4,227,969 | 10/1980 | Engel | 196/115 |
| 4,235,609 | 11/1980 | Garigioli | 55/226 |
| 4,272,371 | 6/1981 | Moses et al. | 210/168 |
| 4,289,583 | 9/1981 | Engel | 196/115 |
| 4,295,966 | 10/1981 | LeBlanc et al. | 210/180 |
| 4,297,212 | 10/1981 | Padgett, Sr. | 210/168 |

(List continued on next page.)

FOREIGN PATENT DOCUMENTS

| | | |
|---|---|---|
| 575123 | 5/1959 | Canada . |
| 734098 | 4/1943 | Germany . |
| 3317008 | 11/1984 | Germany . |
| 3-89923 | 4/1991 | Japan . |
| 893882 | 8/1988 | U.S.S.R. . |
| 480676 | 2/1938 | United Kingdom . |
| 1424625 | 2/1976 | United Kingdom . |
| 2069857 | 9/1981 | United Kingdom . |

OTHER PUBLICATIONS

U.S. Department of Energy "Initial Assessment of Selected Advanced Lubricating Oil Filters" Sep. 1981.

Primary Examiner—Stanley S. Silverman
Assistant Examiner—Theodore M. Green
Attorney, Agent, or Firm—Haugen & Nikolai. P.A.

[57] ABSTRACT

A device for filtering and refining oil being cycled through an engine includes a container, a cover having an evaporator plate incorporated therein, and a filter cartridge. The evaporator plate is dimensioned to conform to a predetermined inner shape of the container to sealably fit therein inhibiting the purified oil to cycle back through the filter. The configuration is such that a predetermined amount of oil is directed into the device and first passes through the filter cartridge and then passes over the evaporator plate. The contaminants evaporated from the oil pass through a vent in the cover. The filtered and refined oil is then directed back into the engine.

17 Claims, 3 Drawing Sheets

U.S. PATENT DOCUMENTS

| | | | |
|---|---|---|---|
| 4,304,663 | 12/1981 | Manders | 210/90 |
| 4,329,226 | 5/1982 | Thompson | 210/180 |
| 4,349,438 | 9/1982 | Sims | 210/180 |
| 4,354,946 | 10/1982 | Warlick et al. | 210/774 |
| 4,369,110 | 1/1983 | Picek | 210/180 |
| 4,387,691 | 6/1983 | Marcoux et al. | 123/557 |
| 4,388,185 | 6/1983 | Ott et al. | 210/136 |
| 4,443,334 | 4/1984 | Shugarman et al. | 210/168 |
| 4,458,642 | 7/1984 | Okubo et al. | 123/196 |
| 4,529,866 | 7/1985 | Leary | 219/205 |
| 4,655,914 | 4/1987 | Wada | 210/168 |
| 4,661,255 | 4/1987 | Aumann et al. | 210/491 |
| 4,758,338 | 7/1988 | Johnson, Sr. | 210/168 |
| 4,784,751 | 11/1988 | McGehee | 208/181 |
| 4,830,745 | 5/1989 | van der Meulen | 210/168 |
| 4,832,836 | 5/1989 | Selsdon | 210/133 |
| 4,853,120 | 8/1989 | Frantz | 210/184 |
| 4,943,352 | 7/1990 | Lefebvre et al. | 196/46.1 |
| 4,950,400 | 8/1990 | Girondi | 210/335 |
| 5,078,877 | 1/1992 | Cudaback et al. | 210/315 |
| 5,095,971 | 3/1992 | Hehl | 165/47 |
| 5,110,460 | 5/1992 | Gilas | 210/149 |
| 5,156,135 | 10/1992 | Snyder | 123/557 |
| 5,198,104 | 3/1993 | Menyhert | 210/149 |
| 5,211,845 | 5/1993 | Kaneshige | 210/186 |
| 5,217,606 | 6/1993 | Ramponi et al. | 210/136 |
| 5,238,474 | 8/1993 | Kahlbaugh et al. | 55/320 |
| 5,242,034 | 9/1993 | DePaul | 184/6.22 |
| 5,322,596 | 6/1994 | Arntz | 196/46.1 |

OIL FILTERING AND REFINING DEVICE

BACKGROUND OF THE INVENTION

I. Field of the Invention

This invention relates generally to oil filtration equipment, and more particularly to a filtration device which both filters and refines the oil as it passes through the device. The filtration device includes a container, a filter, and a cover having an evaporator plate extending from the cover, which effectively removes impurities from the oil.

II. Discussion of the Related Art

The longevity of oil used to lubricate moving parts in an engine is found to vary depending on the extent of filtration and removal of impurities from the oil before the oil composition breaks down. While most engines have some sort of oil filtering device, contaminants remain in the oil which leads to a break down in the oil composition. Equipment is sold today that filters the oil and attempts to evaporate contaminants from the oil, but such systems tend to be inefficient, costly and/or time consuming to replace the filter.

In U.S. Pat. No. 2,839,196(the '196 patent) an oil reclaimer is described comprising a container having a center post extending from the closed bottom end to the open top end of the container. A plate is mounted to the centerpost below an outlet port. A cover is also mounted to the centerpost. Within the cover is a heating element that heats the cover. Heat is transmitted towards the plate, thereby heating oil flowing over the plate. This method of heating the oil is inefficient. Further, when replacing the filter within the container, the cover must first be detached from the centerpost and then the plate must be detached from the centerpost. These steps are time consuming, reducing the efficiency of a filter change. When replacing several filters a day, the amount of time required to change each filter needs to be at a minimum. Therefore a need exists for a oil reclaimer that efficiently heats the oil, and wherein the filter may be quickly and easily replaced.

Likewise, in U.S. Pat. No. 3,616,885(the '885 patent) an oil reclaimer is disclosed comprising a container, filter, plate and cover. A heating element is shown extending from the cover, embedded in the cover or partially extending into a portion of the plate. The cover is bolted to the plate, however, it is not at all clear how the plate is retained or fastened within the container. Similar to the '196 patent, the means for evaporating the contaminants is inefficient.

The Malec patent, U.S. Pat. No. 4,115,201 describes a oil reclaimer wherein lugs extend from the inner surface of the container. A plate has slots sized larger than the lugs allowing the plate to be positioned below the lugs. The plate is then rotated so that the plate can not be pulled back out past the lugs. A cover is then bolted to the plate. Again this device reduces the efficiency of changing the filter. The heating element of the Malec patent is positioned on the surface of the plate. There is an increased chance of igniting the oil when the oil is in direct contact with the heat element. Hence, a need exists for an oil reclaimer wherein the filter may be efficiently replaced, and having a heating means that efficiently heats the oil without unnecessary increased risk of igniting the oil.

The U.S. Pat. No. 3,756,412 to Barrow also discloses a plate that is secured within the container by a plurality of retaining lugs. The cover is bolted to the plate, thereby requiring additional steps to remove the filter. A heating element is embedded within the plate, thereby increasing the efficiency of heating the oil. However, the electrical connection for this element is shown extending through the side of the container. There is an increased chance that the element would be exposed to oil, thereby increasing the chance of igniting the oil. Hence a need exists for a plate that is efficiently heated wherein the electrical connection does not extend from the side of the container and does not come in contact with the oil.

In U.S. Pat. Nos. 4,189,351, 4,289,583 and 4,227,969 to Engel, and U.S. Pat. No. 4,943,352 to Lefebvre there is described an oil reclamation device for filtering and refining oil to be reclaimed. A heating core is positioned within a center core extending from the cover. The center core is in direct contact with the plate, thereby heating the plate through heat transfer. The cover not only heats the plate and air within the heat chamber, but it also heats the outside air. Operation of this device in northern climates during the winter months is a very inefficient means of heating the plate. The plate is bolted to the cover and the cover is bolted to the container. Unrefined oil may seep through the bolt from the filtering region onto the plate's top surface, thereby contaminating the refined oil. Hence a need exists for an oil reclamation device wherein the cover and plate may be removed together, and further having an efficient means of heating the plate.

The present invention overcomes these and other disadvantages by providing a filtering and refining device having a cover and plate that may be removed simultaneously and that further efficiently heats the top surface of the plate.

SUMMARY OF THE INVENTION

The problems alluded to above are solved in accordance with the present invention by providing an oil filtering and refining device that comprises a hollow cylindrical container, a filter that fits snugly within the container, and a cover which sealably engages with the open end of the container. The cover further includes an evaporator plate extending therefrom, which aligns and sealably engages with the filter and inner surface of the container.

In the preferred embodiment, the container is cylindrical in shape having an oil inlet port disposed in the bottom of the container. The container is sized such that the filter snugly fits within the container. The filter is enclosed in a casing and has an inlet in the bottom of the casing and an outlet in the top of the casing. Without limitation, a cotton filtering media is compressed within the casing. Those skilled in the art will recognize that other suitable materials may be used as a filtering media. A seal may be positioned between the inside bottom surface of the container and the bottom of the filter, thereby sealing the inlet port of the container with the inlet of the filter's casing.

The cover is sized to sealably engage with the opening of the container. A lip extends around the perimeter of the open end of the container. The bottom side of the lip tapers away from the container. Likewise, a mirror image of the containers lip extends around the perimeter edge of the cover. When the cover is engaged with the container, a seal may be aligned between the container's lip and the cover's lip, and a grooved clamp may be used to sealably force the cover against the container. A vent may be disposed in the cover, to allow the evaporated contaminants to be released from the device.

An evaporator plate extends from the inner surface of the cover from a central column. The evaporator plate's perimeter is shaped to sealably engage the inner sidewall of the container. A separate seal may be positioned between the bottom of the evaporator plate and the top of the filter's casing. Bores extend through the evaporator plate, wherein the oil exiting the filter outlet travel through the bores and spreads out over the top surface of the evaporator plate. A heating element is enclosed within the evaporator plate and heats the plate so that contaminants are evaporated from the oil spread out over the top surface of the evaporator plate, thereby refining the oil. The filtered and refined oil is directed out of the device through an outlet formed in the side of the container. The heating element coils around the evaporator plate and through the center of the cover's column. A snap-in electrical connector is connected to an end of the heating element and is sealably affixed to the outer surface of the cover.

The evaporator plate may additionally have steeples that are aligned above each bore, having apertures extending through the steeples and intersecting the bore. The oil then travels through the bores, into and through the apertures and out over the steeples surface. The addition of the steeples increases the total surface area of the evaporator plate, which aids in evaporating the contaminants from the oil.

It is accordingly a principal object of the present invention to provide a device for filtering and refining oil having a one-piece cover and evaporator plate, thereby reducing the amount of time required to replace the filter.

Another object of the present invention is to provide an evaporator plate wherein the heat source directly heats the evaporating surface, thereby reducing the amount of energy required to evaporate the contaminants.

Still another object of the present invention is to provide a filtering and refining device that is durable, simple and easier to produce.

These and other objects and advantages as well as these and other features will become apparent to those skilled in the art from the following detailed description of a preferred embodiment of the invention, especially when considered in conjunction with the accompanying drawings in which like numerals in the several views refer to corresponding parts.

DETAILED DESCRIPTION OF THE PREFERRED EMBODIMENT

Figure 1:
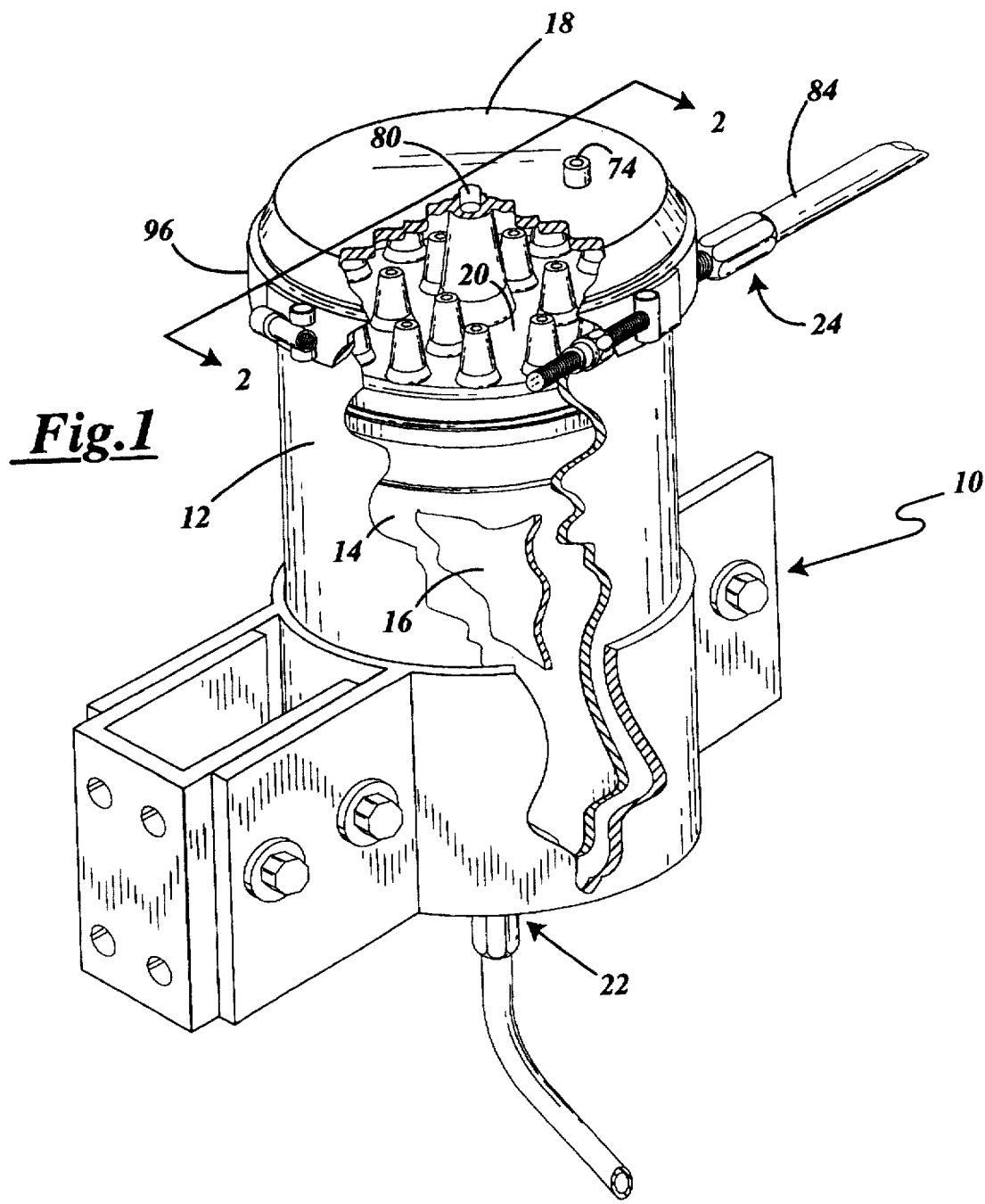
FIG. 1 is an exploded, partial sectional perspective view of the oil filtration and refining device of the present invention.

Referring first to FIG. 1, there is shown generally the filtering and refining device 10. The filtering and refining device 10 comprises a container 12, a filter casing 14 filled with a filtering medium 16 (the "filter"), a cover 18 having an evaporator plate 20 extending therefrom, an oil inlet 22 and an oil outlet 24. Without limitation, the device 10 may be used to filter and refine fluids, including the motor oil from a vehicle's engine.

Figure 2:
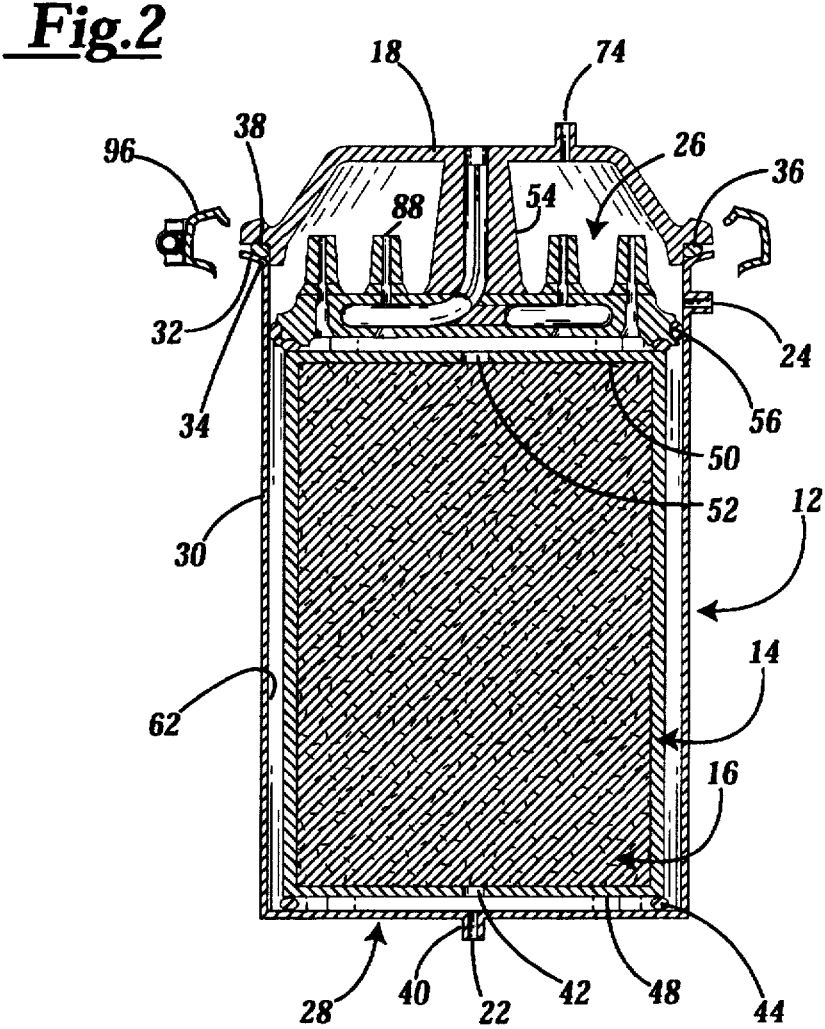
FIG. 2 is a cross-sectional view through lines 2—2 of FIG. 1, with the clamp removed and elevated from the cover and container.

Referring next to FIG. 2, the container 12 is hollow, having an open top end 26 and a closed bottom end 28. The sidewall 30 extends between the open top end 26 and the closed bottom end 28. A tapered lip 32 extends from a top edge 34 of the container 12. The cover 18 has a similar tapered lip 36 extending therefrom. When the cover 18 is engaged with the container 12, an o-ring seal 38 is positioned between the container's tapered lip 32 and the cover's tapered lip 36, thereby sealably engaging the cover 18 and container 12.

An inlet port 22 is disposed proximate the bottom end 28 of the container 12. A conventional metering valve 40 is affixed to the inlet port 22. The metering valve 40 controls the amount of fluids entering the container 12 and preferably allows 4–5 gallons to enter the container per minute. As the fluid flows into the container under pressure or through gravitation, it enters an inlet 42 of the filter 14. Of course, a seal 44 may be positioned between the filter 14 and bottom end 28 of the container 12, proximate the inlet port 22 and the filter's inlet 42, thereby further directing the fluid into the filter's inlet 42.

The filter 14 comprises a casing 46 which is filled with a filtering medium 16. The bottom end 48 of the casing 46 has a filter inlet 42 and the top end 50 of the filter has a filter outlet 52. The fluid travels through the filtering medium 16 and exits the casing 46 through the filter outlet 52. Those skilled in the art will recognize that any of a number of filter mediums could be used, including but not limited to: cotton, woven wire cloth, nylon cloth, closely packed glass fibers, and plastic membranes, however, compressed cotton is preferred.

Figure 4:
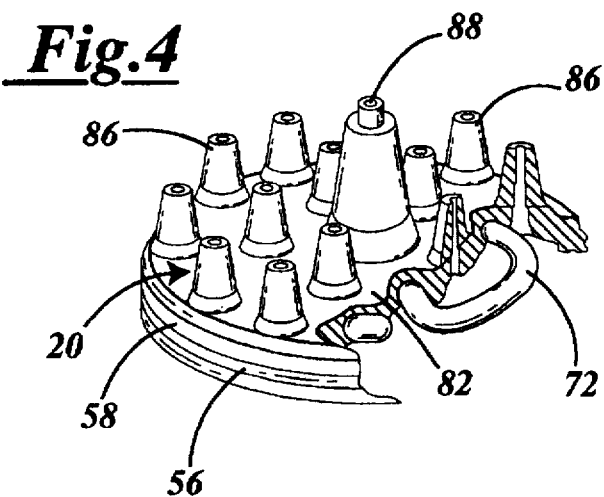
FIG. 4 is a partial sectional perspective view of the evaporator plate of the type shown in FIG. 3.
Figure 5:
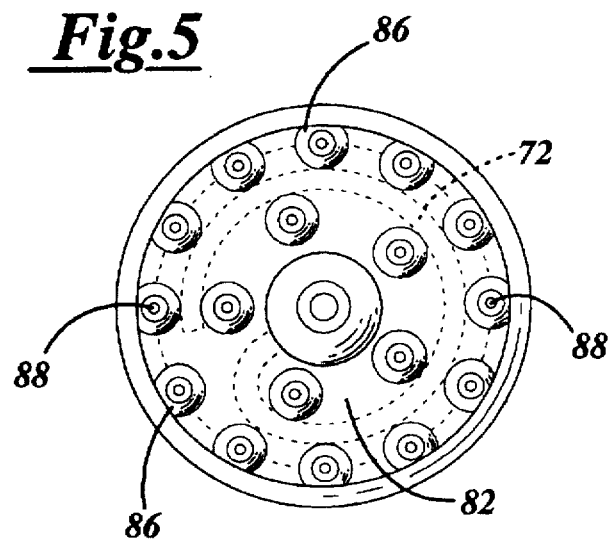
FIG. 5 is a top elevational view of the evaporator plate of the type shown in FIG. 3.
Figure 6:
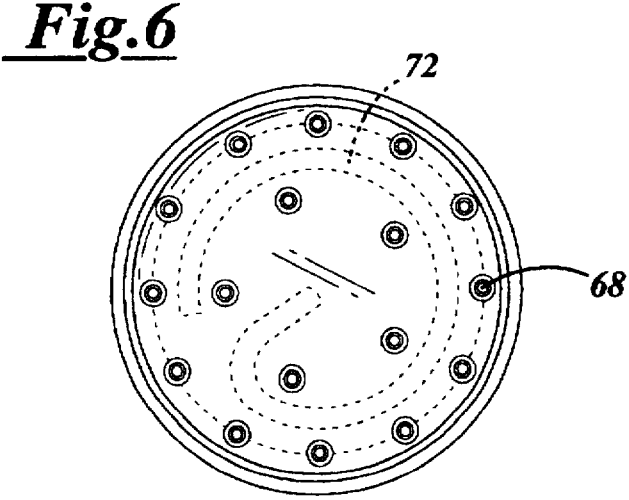
FIG. 6 is a bottom elevational view of the evaporator plate of the type shown in FIG. 3.

Extending from a center portion of the cover 18 is a column 54. At the end of the column 54 is the evaporator plate 20 which radially extends perpendicularly outward. The evaporator plate 20 is sized to snugly fit into the container 12. A groove 56 is formed within the evaporator plate's side 58, wherein a seal 60 may be held in place (see FIG. 4). When the cover 18 is engaged with the container 12, the evaporator plate's seal 60 engages with the inner surface 62 of the sidewall 30, thereby sealing the filter 14 between the evaporator plate 20 and the container's bottom end 28. An additional seal 66 may be positioned between the bottom 64 of the evaporator plate 20 and the top of the filter's casing 46 to further direct the oil from the filter 14 through the evaporator plate 20 (see FIGS. 2 and 3). Referring to FIGS. 4–6, the evaporator plate 20 has bores 68 extending therethrough. The fluid passes through the bores 68 and flows onto the top surface 82 of the evaporator plate 20. A conventional heating core 72 molded into the evaporator plate 20 directly heats the evaporator plate 20, thereby efficiently evaporating from the fluid various contaminants. The conventional heating core 72 is commercially available from, for example, Heatron, Inc., of Leavenworth, Kansas. The evaporated contaminants are released through a vent 74 disposed in the top of the cover 18. The heating core 72 extends into the column 54 and ends with contact leads 76 connected with an electrical plug 78. The plug 78 is sealably affixed within a recess 80 of the cover 18 (see FIG. 1).

An outlet port 24 is disposed through the sidewall 30 near the open top end 26 of the container 12. When the cover 18 is engaged with the container 12, the top surface 82 of the evaporator plate 20 is aligned with at least a portion of the fluid outlet 24. The fluids flowing over the evaporator plate 20 flow outward and around to the fluid outlet 24. The fluid then drains out the filtration device 10 through an out take hose 84.

To further maximize the amount of heated surface area over which the fluid must travel, steeples 86 may be formed extending from the top surface 82 of the evaporating plate 20. The steeples 86 have apertures 88 that are smaller than the evaporator plate's bores 68, which intersect with the bores 68 (see FIGS. 4–6). The fluid travels through the bores 68 and apertures 88 and flows out over the steeples 86 and onto the top surface 82 of the evaporator plate 20. The change in size between the apertures 88 and bores 68 further controls the rate of flow of the fluid over the steeples 86.

Figure 3:
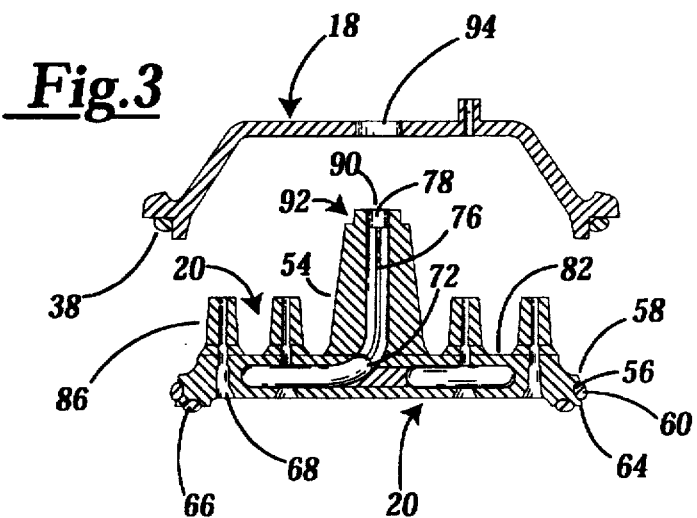
FIG. 3 is a side elevational sectional view of an alternate preferred cover separated from the evaporator plate.

Referring next to FIG. 3 an alternate preferred embodiment of the cover 18 and evaporator plate 20 is shown. The cover 18 and evaporator plate 20 may be manufactured in two pieces to reduce the cost of manufacturing. The top end 90 of the column 54 has a male adapter 92 which is sized to fit into a bore 94 extending through the cover 18. The male adapter 92 is press fit with approximately 10,000 psi or more, thereby ensuring that the cover 18 and plate 20 are sealed and will not separate under normal use. The one piece cover 18 and evaporator plate 20 reduces the amount of time required to remove and replace the filter.

Referring again to FIGS. 1 and 2, a v-grooved band 96 is shown extending around the tapered lips 32 and 36 of the cover and container. The tapered lips 32 and 36 fit into the v-grooved band 96, and as the band is tightened, the cover 18 and container 12 are drawn towards each other. The v-grooved band 96 is quickly removed, thereby further reducing the amount of time required to remove and replace the filter 14.

This invention has been described herein in considerable detail in order to comply with the Pat. Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An oil filtration and refining device, comprising:
   (a) a hollow container having an open top end, a closed bottom end, and a continuous sidewall extending between the open top end and the closed bottom end, said closed bottom end including an inlet port disposed proximate the closed bottom end, said continuous sidewall having an outlet port disposed proximate the open top end;
   (b) a metering valve connected to the inlet port;
   (c) a removable filter having an inlet and outlet wherein the filter's inlet is aligned proximate the hollow container's inlet port, said filter being positioned within said hollow container, wherein an end of said removable filter proximate the open top end of said hollow container is positioned below said outlet port;
   (d) a cover sealably engaged with said open top end of said hollow container, said cover having an evaporator plate extending from said cover, wherein said evaporator plate includes an evaporating surface, such that when said cover is engaged with said open top end, an upper surface of the evaporator plate is aligned proximate said outlet port and a side of said evaporator plate sealably engages with an inner surface of said continuous sidewall, said upper surface and a lower surface of said evaporator plate having a plurality of bores extending therebetween; and
   (e) a heating element enclosed within the evaporator plate and in a spaced apart relationship from said upper surface and traverse to said plurality of bores, such that oil does not contact said heating element.

2. The oil filtration and refining device as in claim 1 wherein said cover further includes a vent disposed in said cover.

3. The oil filtration and refining device as in claim 2 wherein the lower surface of said evaporator plate further includes a seal, thereby sealably engaging with said filter.

4. The oil filtration and refining device as in claim 1 wherein the upper surface of said evaporator plate further includes a plurality of steeples corresponding with the plurality of bores within said evaporator plate, each of said steeples having an aperture extending therethrough and intersecting the plurality of bores of said evaporator plate.

5. The oil filtration and refining device as in claim 4 wherein the lower surface of said evaporator plate further includes a seal, thereby sealably engaging with said filter.

6. The oil filtration and refining device as in claim 5 wherein a bottom of said filter sealably engages with the bottom end of said hollow container.

7. The oil filtration and refining device as in claim 1, wherein the lower surface of said evaporator plate further includes a seal, thereby sealably engaging with said filter.

8. The oil filtration and refining device as in claim 1 wherein the lower surface of said evaporator plate further includes a seal, thereby sealably engaging with said filter.

9. An oil filtration and refining device, comprising:
   (a) a hollow container having an open top end, a closed bottom end, and a continuous sidewall extending between the open top end and the closed bottom end, said closed bottom end including an inlet port disposed proximate the closed bottom end, said continuous sidewall having an outlet port disposed proximate the open top end;
   (b) a metering valve connected to the inlet port;
   (c) a removable filter having an inlet and outlet wherein the filter's inlet is aligned proximate the hollow container's inlet port, said filter being positioned within said hollow container, wherein an end of said removable filter proximate the open top end of said hollow container is positioned below said outlet port;
   (d) a cover sealably engaged with said open top end of said hollow container, said cover having an evaporator plate extending from said cover, wherein said evaporator plate includes an evaporating surface, such that when surface of the evaporator plate is aligned proximate said outlet port and a side of said evaporator plate sealably engages with an inner surface of said continuous sidewall, said upper surface and a lower surface of said evaporator plate having a plurality of bores extending therebetween, the upper surface of said evaporator plate further includes a plurality of steeples corresponding with the plurality of bores within said evaporator plate, each of said steeples having an aperture extending therethrough and intersecting the plurality of bores of said evaporator plate; and
   (e) a heating element enclosed within the evaporator plate.

10. The oil filtration and refining device as in claim 9 wherein said cover further includes a vent disposed in said cover.

11. The oil filtration and refining device as in claim 10 wherein the lower surface of said evaporator plate further includes a seal, thereby sealably engaging with said filter.

12. The oil filtration and refining device as in claim 10 wherein a bottom of said filter sealably engages with the bottom end of said hollow container.

13. An oil filtration and refining device, comprising:

(a) a hollow container having an open top end, a closed bottom end, and a continuous sidewall extending between the open top end and the closed bottom end, said closed bottom end including an inlet port disposed proximate the closed bottom end, said continuous sidewall having an outlet port disposed proximate the open top end;

(b) a metering valve connected to the inlet port;

(c) a removable filter having an inlet and outlet wherein the filter's inlet is sealably aligned proximate the hollow container's inlet port, said filter being positioned within said hollow container wherein, an end of said removable filter proximate the open top end of said hollow container is positioned below said outlet port;

(d) a cover sealably engaged with said open top end of said hollow container, said cover having an evaporator plate extending from said cover, wherein said evaporator plate includes an evaporating surface, such that when said cover is engaged with said open top end, an upper surface of the evaporator plate is aligned proximate said outlet port and a side of said evaporator plate sealably engages with an inner surface of said continuous sidewall, said upper surface and a lower surface of said evaporator plate having a plurality of bores extending therebetween, the upper surface of said evaporator plate further includes a plurality of steeples corresponding with the plurality of bores within said evaporator plate, each of said steeples having an aperture extending therethrough and intersecting the plurality of bores of said evaporator plate; and (e) a heating element enclosed within the evaporat plate.

14. The oil filtration and refining device as in claim 13 wherein said cover further includes a vent disposed in said cover.

15. The oil filtration and refining device as in claim 14 wherein the lower surface of said evaporator plate further includes a seal, thereby sealably engaging with said filter.

16. The oil filtration and refining device as in claim 15 wherein a bottom of said filter sealably engages with the bottom end of said hollow container.

17. The oil filtration and refining device as in claim 13, wherein the lower surface of said evaporator plate further includes a seal, thereby sealably engaging with said filter.

* * * * *

UNITED STATES PATENT AND TRADEMARK OFFICE
CERTIFICATE OF CORRECTION

PATENT NO. : 5,630,956
DATED : May 20, 1997
INVENTOR(S) : Donald C. Lynch

It is certified that error appears in the above-indentified patent and that said Letters Patent is hereby corrected as shown below:

In column 5, line 43, delete "and" and insert -- end --;

In column 5, line 65, delete "evaporat or" and insert -- evaporator --; and

In column 6, line 57, delete "evaporat or" and insert -- evaporator --.

Signed and Sealed this

Nineteenth Day of August, 1997

Attest:

BRUCE LEHMAN

Attesting Officer

Commissioner of Patents and Trademarks